US005382108A

United States Patent [19]

Ojima

[11] Patent Number: 5,382,108

[45] Date of Patent: Jan. 17, 1995

[54] SLOW-ACTING ROTARY SHAFT DEVICE

[75] Inventor: Juji Ojima, Kanagawa, Japan

[73] Assignee: NHK Spring Co., Ltd., Aiko, Japan

[21] Appl. No.: 154,381

[22] Filed: Nov. 18, 1993

Related U.S. Application Data

[63] Continuation of Ser. No. 793,537, Nov. 18, 1991, abandoned.

[30] Foreign Application Priority Data

Nov. 21, 1990 [JP] Japan ........ 2-319204

[51] Int. Cl.[6] ........ F16C 11/00

[52] U.S. Cl. ........ 403/120; 403/92; 403/113; 403/117; 16/308; 16/376; 248/923

[58] Field of Search ........ 403/120, 84, 93, 92, 403/24, 25, 117, 91, 161; 16/308, 374, 376, 342; 248/918, 919, 922, 923

[56] References Cited

U.S. PATENT DOCUMENTS

| | | | |
|---|---|---|---|
| 2,587,168 | 2/1952 | Kessler | 403/117 |
| 3,022,536 | 2/1962 | Floehr | 16/308 |
| 3,787,923 | 1/1974 | Peterson | 16/308 |
| 4,408,799 | 10/1983 | Bowman | 16/342 X |

FOREIGN PATENT DOCUMENTS

| | | | |
|---|---|---|---|
| 495211 | 4/1930 | Germany | 403/120 |
| 2018888 | 10/1979 | United Kingdom | 403/84 |

*Primary Examiner*—Randolph A. Reese
*Assistant Examiner*—Harry C. Kim
*Attorney, Agent, or Firm*—Keck, Mahin & Cate

[57] ABSTRACT

In a slow-acting rotary shaft device, a shaft, which rotatably supports a second member, includes a hollow shaft body latched to a first member inrotatably, a cap member outwardly inserted on an end portion of the shaft body rotatably and latched to the second member inrotatably, a torsion bar which has one end latched with the shaft body and another end latched with a cap member, and a viscous grease enclosed between the shaft body and cap members. The hollow shaft body is divided into two portions, a body portion of which latches to one of the end portions of the torsion bar. In opposite surfaces of the two portions, a projection formed at one surface and a concave portion formed at another surface are loosely inserted and provided with a relatively rotatable race area. When this device is used, the rotative member is rotated at a slow speed by a jumping up torque of the torsion bar in a rotation area up to a neutral point, while in a rotation area past the neutral point, the rotative member can be stopped at any position.

4 Claims, 4 Drawing Sheets

(c)

(a)

(b)

SLOW-ACTING ROTARY SHAFT DEVICE

This is a continuation of application Ser. No. 07/793,537, filed Nov. 18, 1991, abandoned.

BACKGROUND OF THE INVENTION

This invention relates to a slow-acting rotary shaft device which supports a second member rotatably which rotates relatively with respect to a first member.

This slow-acting rotary shaft device is, for instance, used for a rotatably supporting portion of a hinge device of a compact case for makeup, a radio cassette, a dashboard of a car and the like.

Such type of a slow-acting rotary shaft device consists of a shaft 3 which supports a rotary member 1 rotatably which rotates relatively with respect to a fixed member 2 as shown in FIG. 6.

The shaft 3 approximately consists of, as shown in FIG. 7 and FIG. 8, a hollow shaft body 31, cap members 32 and 33 rotatably inserted outwardly to both sides of the shaft body 31, a torsion bar 4 latched to one end hook portion 41 in the shaft body 31, while latching another end hook portion 42 in the cap member 33, and a viscous grease (not shown) enclosed between the shaft body 31 and the cap members 32 and 33.

The shaft body 31 is provided with a shaft laving a stopped portion wherein small diameter shaft portions **31*b* where cap members 32 and 33 are inserted outwardly and rotatably therethrough are formed at both sides of a large diameter shaft portion 31*a*, and a slit penetrated hole 34 is formed in a longitudinal direction. The large diameter shaft portion 31*a* is provided with a projected key 35. The cap members 32 and 33 are formed to be cylinders having bottoms respectively, inner and outer diameters of said each cylinder being formed respectively to be an approximately same outer diameter of the small shaft portion 31*b* and the same outer diameter of the large diameter portion 31*a*. Each of the cap members 32 and 33 is respectively provided with a projected key portion 37 and 38** at the outer circumference thereof.

At the bottom of the cap member 33 is formed a slit concave 36. The cap members 32 and 33 are outwardly inserted to small diameter portions **31*b* and 31*c*, respectively, circular grooves 32*a* and 33*a* of cap members 32 and 33 being inserted over circular ribs 31*c* on each small diameter shaft portion 31*b* respectively to prevent it from falling off so that it may be rotatably incorporated to the shaft body 31**.

In this incorporated state, the torsion bar 4 is inserted into the penetrated hole 34 of the shaft body 31, one hook portion 41 thereof being latched with Said penetrated hole 34, while another end hook portion 42 being latched with the concave 36 of the cap member 33, and the viscous grease is enclosed between cap members 32, 33 and small diameter shaft portions **31*b*, 31*b*** respectively.

The shaft 3 thus incorporated is inserted into a pivotally supporting portion by standing up the rotary member 1 at 90° with respect to the fixed member 2 so that key grooves (not shown) provided at each shaft supporting portion of the rotative member 1 and the fixed member 2 may correspond each other. By this insertion, the shaft 3 positions the large diameter shaft portion **31*a* of the shaft body 31 in the bearing portion 21 of the fixed member 2, places the cap members 32 and 33 in the rotatable supporting portions 11 and 12 of the rotative member respectively and then inserts each key 35,37 and 38 into key grooves (not shown) formed at bearing portion 21 and rotatably supporting portions 11 and 12 respectively whereby the large diameter shaft portion 31*a* and the cap members 32 and 33 are respectively attached to the bearing portion 21 and the rotatable supporting portions 11 and 12** inrotatably.

In the conventional slow-acting rotary shaft device thus constituted, a jumping up torque is storaged in the torsion bar 4 by the rotation of the rotative member 1 from the neutral point b to the closed direction, and the negative member 1 is fixed to the fixed member 2 with an appropriate locking means at the whole closed point a where the jumping up torque becomes max. (Please see FIG. 9). By this, the locking means is released, the rotative member 1 rotates in the opening direction by the jumping up torque of the torsion bar 4. At the time of this rotation, a shearing resistance of the viscous grease occurs and the rotative member 1 rotates with a slow-speed and can be stopped at the neutral point b in spite of the torque load of the torsion bar 4.

Thus, the conventional slow-acting rotary shaft can perform a slow-acting operation effectively at an area $\alpha 1$ from whole closing point a of the rotative member 1 to the neutral point b as shown in FIG. 9.

In such a hinge device, it is required to improve to a free stop area wherein the rotative member 1 can be stop at an any point in $\alpha 2$ area from the neutral point b to the whole opening point c by maintaining the max. rotation angle $\alpha$ of the rotative member 1 at approximately 135° as shown in FIG. 9. In this case, it is impossible to satisfy this requirement by use of the conventional slow-acting rotary shaft device.

In other words, when the rotative member 1 is rotated from the neutral point b to the whole opening point c, the torsion bar 4 in the shaft 3 is twisted in the neutral direction against the closing direction at the time of the rotation in the $\alpha 1$ area described above whereby the torque is storaged in the torsion bar 4. The storaged torque operates to return the rotary member 1 in the neutral point b direction against the shearing resistance of the viscous grease. Accordingly, it is impossible to stop tile rotative member 1 at any point.

Further, when the rotative member 1 is rotated in the whole areas of the area $\alpha 1$ and the area $\alpha 2$ by aid of the torque of the torsion bar 4 by providing an initial torque to the torsion bar 4, the rotation moment of the rotative member 1 coincides with an operation direction of the torque of the torsion bar 4 in the $\alpha 2$ area whereby it is impossible to stop the rotative member 1 at any point by only the shearing resistance of the viscous grease.

Furthermore, the torsion bar 4 is restrained a twisting direction at the time of use by setting. This occurs such problem as a fact that when a rotation angle in $\alpha 2$ area increases the endurance of the torsion bar 4 decreases by the occurrence of the permanent setting.

This invention is performed in view of such case. The object of this invention is to provide a slow-acting rotary shaft device which is used for a pivotally supporting portion of a hinge device wherein the rotation angle of the rotative member exceeds the neutral point and enables to be a free stop area which is possible to rotate the rotative member with a slow-acting speed by the jumping up torque of the torsion bar in the rotary area within the neutral point and is possible to stop the rotative member at any point in the rotation area exceeds the neutral point thereof.

BRIEF DESCRIPTION OF THE INVENTION

In order to attain the above properly, this invention is characterized by the fact that the shaft which rotatably supports a second member which rotates relatively with respect to the first member comprises:

- a hollow shaft body latched with the first member inrotatably;
- cap members outwardly inserted to an end portion of the shaft body rotatably and latched with the second member inrotatably;
- a torsion bar wherein one end portion thereof is latched with the above shaft body while another end portion thereof is latched with the cap member;
- a viscous grease enclosed between the above shaft body and the cap member; and
- said hollow shaft body is divided into two portions consisting of a body portion which latches to the first members and a latching portion which latches to an end portion of the torsion bar, and a projection formed at one side of the opposite end surface of the above both portions is loosely inserted into a concave formed at another surface being provided with a race area wherein the above both portions are relatively rotatable.

The shaft body and the cap members are integrated with the first and the second members respectively and one member of the both members, the first and the second members, rotates with a canter of a pivotally supporting portion with respect to another member. This rotation is performed ranging over both twisting areas in the positive and the negative directions of the torsion bar. In this case, although the relative rotation of the first member or the second member in the twisting area in the positive direction is performed by the torque of the torsion bar, the rotation thereof is performed with a slow speed due to the shearing resistance of the viscous grease enclosed between the shaft body and the cap member in spite of the torque load.

Further, the initial relative rotation of the first or the second member is changed from the twisting in the positive direction to the twisting in the negative one of the torsion bar is performed by tile load of the outer face. The rotation at this time is a relative rotation in a race areas of the body portion and the latched portion which constitute the shaft body, but there occurs the twisting of the torsion bar. The rotated member in this area is small in rotation moment. When the load of the outer force is released in this area, the member is stopped at any position by the shearing resistance of the viscous grease.

Further, the relative rotation of the first or the second member in the twisting area in the negative direction of the torsion bar which exceeds the above race area is performed twisting the torsion bar in the negative direction by the load of the outer load. When the outer force applied to the rotated member in this area is released, a synthetic force applied of the rotated moment of the rotated member and the shearing resistance of the viscous grease is balanced with the torque of the torsion bar thereby being able to stop the rotated member at any position. Thus, the relative rotation of the first or the second member in the twisting area in the negative direction of the torsion bar is performed via the race area, which does not provide the twisting to the torsion bar. Accordingly, it is possible to make smaller a twisting angle in the negative direction of the torsion bar and prepare a free stop area wherein it is possible for the rotated member to stop at any position by releasing the whole twisting area in the negative direction from the outer force.

BRIEF DESCRIPTIONS OF THE DRAWINGS

FIG. 1 shows a shaft which constitutes a slow-acting rotary shaft device according to this invention. FIG. 1(*a*) is a longitudinal sectional view and FIG. 1(*b*) is a left side view thereof. FIG. 2 shows a transverse sectional view of the above shaft. FIG. 2(*a*) is a sectional view along line a—a, FIG. 2(*b*) is a sectional view along line b—b, FIG. 2(*c*) is a sectional view along line c—c, FIG. 2(*d*) is a sectional view along line d—d, and FIG. 2(*e*) is a sectional view along line e—e. FIG. 3 is a perspective view of a material portion of a shaft body which constitutes the above shaft. FIG. 4 shows a hinge device attached to the above shaft. FIG. 4(*a*) is a elevation view thereof, and FIG. 4(*b*) and FIG. 4(*c*) are side views thereof. FIG. 5 shows an operation of the above hinge device. FIG. 5(*a*) is a side view in a neutral state thereof and FIG. 5(*b*) is a side view in whole opening state thereof. FIG. 6 is a perspective view of a hinge device in the conventional slow-acting rotary shaft device. FIG. 7 is an exploded vertical sectional view of the shaft which constitutes the above slow-acting rotary shaft device. FIG. 8(*a*) is a right side view of one cap member of the above shaft. FIG. 8(*b*) is a sectional view along line b—b of the above shaft and FIG. 8(*c*) is a left side view of another cap member of the above shaft. FIG. 9 is a side view which shows an operation of the above hinge device.

DETAILED DESCRIPTION OF THE INVENTION

This invention will now be hereinafter described with reference to an embodiment illustrated this invention.

In this embodiment, the same element as in the conventional is shown with the same numeral.

Figures 1A, 1B, 2A, 2B, 2C, 2D, 2E:
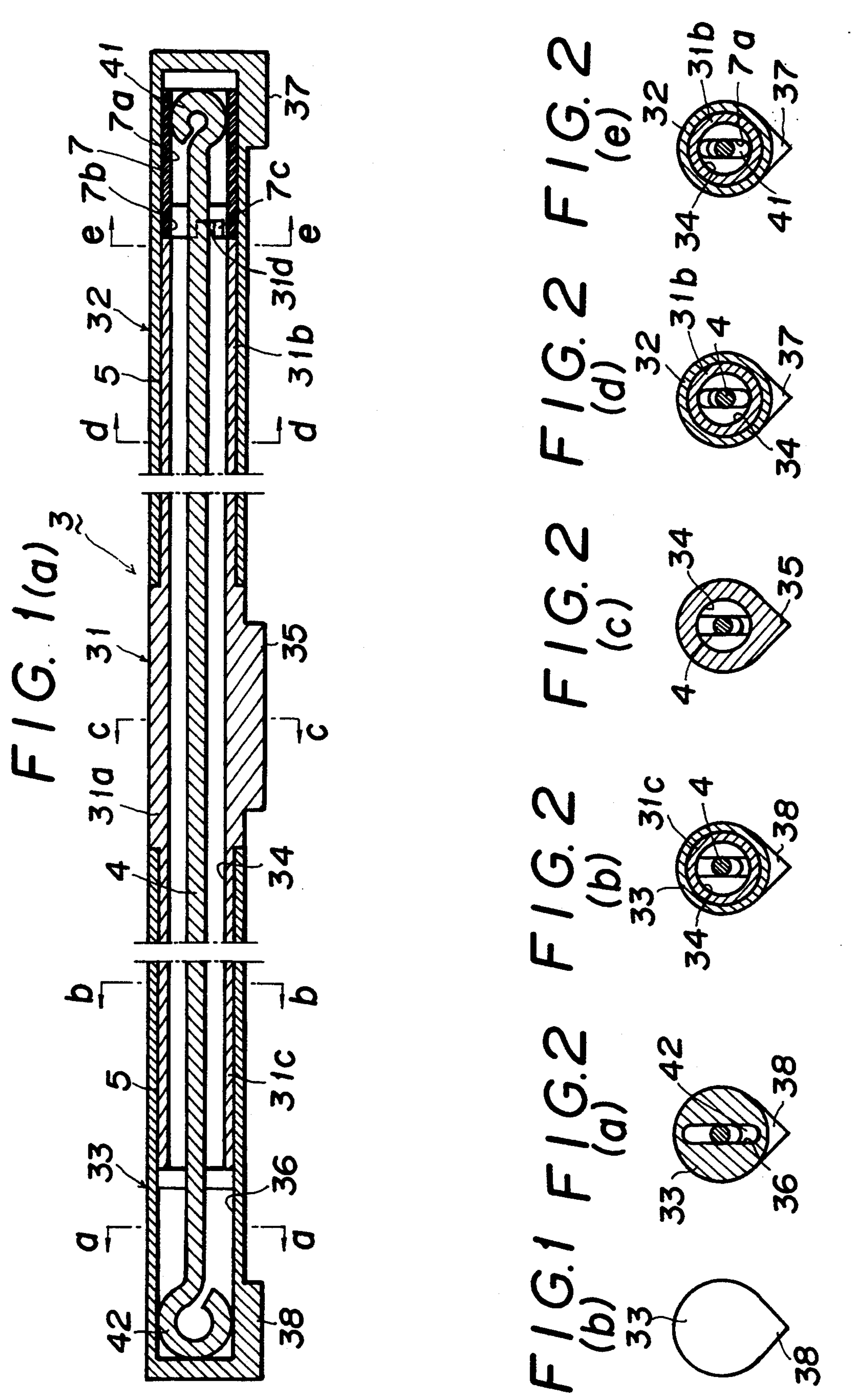

In FIG. 1 and FIG. 2, the shaft 3 of this embodiment approximately consists of a hollow shaft body 31, cap members 32 and 33 outwardly inserted through both sides of this shaft body 31 rotatably, a torsion bar wherein one end hook portion 41 is latched in the shaft body 31, while another end hook portion 42 is latched in the cap member 33, and a viscous grease 5 enclosed between the shaft body 31 and the cap members 32 and 33 the same as in the conventional shaft described above.

The shaft body 31 is formed by a stepped shaft provided with small diameter portions **31*b* and 31*c* outwardly inserted the cap members 32 and 33 respectively and rotatably at both sides of a central large diameter shaft portion 31*a*, and a cylinder 7 continuously connected in the axial direction of the small diameter 31*b*. Thus, the shaft body 31 is constituted by being divided into the body portion which consists of the large diameter portion 31*a* and the small diameter portion 31*b* and the cylinder 7**.

Figure 3:
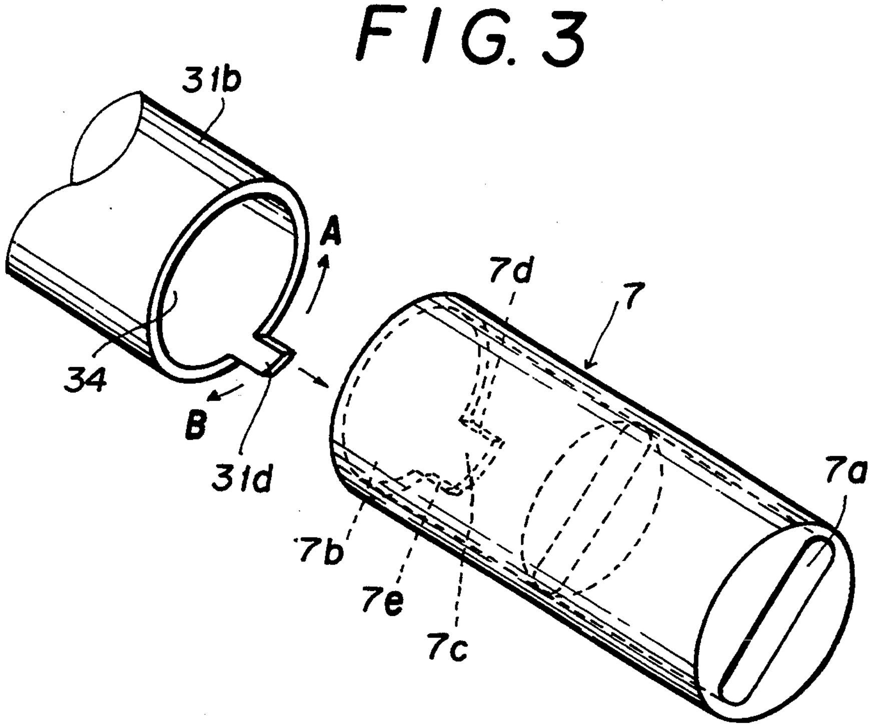

A penetrated circular hole 34 is bored at the body portion of the shaft body 31 in the axial direction and a slit hole **7*a* which opens at one end side of the connecting portion (cylinder 7) and this circular hole 7*b* which opens another end side continuously connected to the slit hole 7*a* are bored respectively (Please see FIG. 3). Further, as shown in FIG. 3, at an opposite end surface of the body portion (small shaft portion 31*b*) and the cylinder 7, a projection 31*d* and a concave 7*c*** are formed at the small shaft portion side 31*b* and the cylinder side 7 respectively, small diameter shaft portion 31*b* and the cylinder 7 being adapted to loosely insert the projection 31*d* into the concave 7*c* thereby abutting the above opposite surfaces to continuously connect them. In this connecting state, a clearance portion between the projection 31*d* and the concave 7*c* becomes a race area wherein the body portion of the shaft body 31 and the latching portion are relatively rotatable. Further, the outer diameter of the small shaft portion 31*b* and the cylinder 7, and the diameter of the penetrated circular hole 34 and of the circular hole 7*b* are formed approximately to be same, and a key 35 is formed at the outside of the large diameter shaft portion 31*a*.

The cap member 32 is formed to be a cylinder having a bottom, said cap member 32 being outwardly inserted to the continuously connected portion of the small diameter shaft portion 31*b* and the cylinder 7 rotatably (FIG. 1(*a*)).

Further, another cap member 33 is formed to be a cylinder having a bottom in which is bored a slit concave 36 at the bottom thereof, said cap member 33 being outwardly inserted to the small diameter shaft portion 31*c* rotatably (FIG. 1(*a*)).

The outer diameters of the cap members 32 and 33 are formed to be the same as the large diameter shaft portion 31*a* of the shaft body 31, at the outer side thereof being formed keys 37 and 38 respectively.

The viscous grease 5 is applied on the surface of the small diameter shaft portions 31*b* and 31*c* and the cylinder 7 at the time of the insertion of the cap members 32 and 33 and each small shaft portions 31*b*, 31*c* and cylinder 7 by the insertion of the cap members 32 and 33.

In this incorporation state, the torsion bar 4 is inserted into the penetrated circular hole 34 of the shaft body 31 to latch the one end hook portion 41 to the slit hole 7*a* of the cylinder 7, while pulling out another hook portion 42 from the penetrated circular hole 34 of the shaft body 31 outward to latch it to the slit concave 36 of the cap member 33, thereby incorporating it in the shaft 3.

Figure 4:
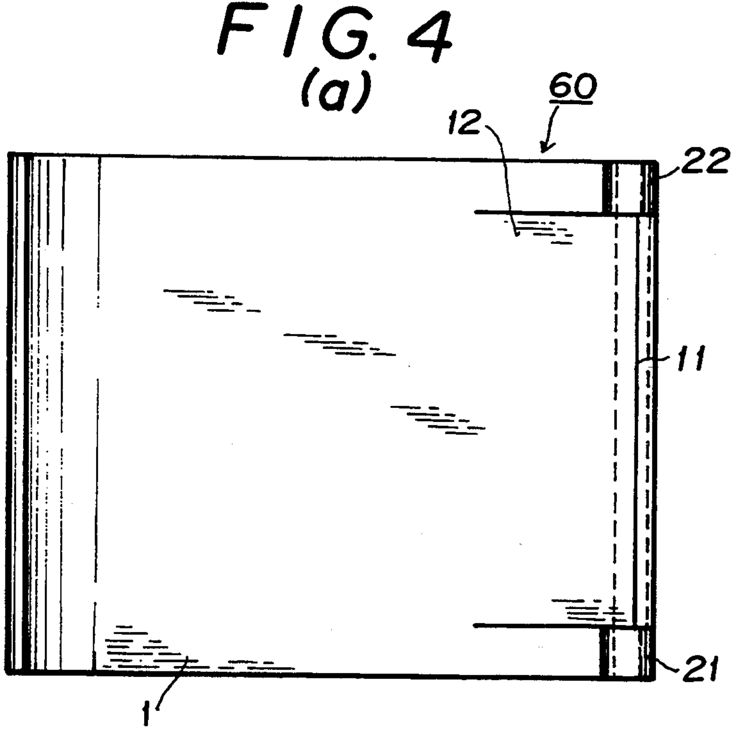
Figure 4:
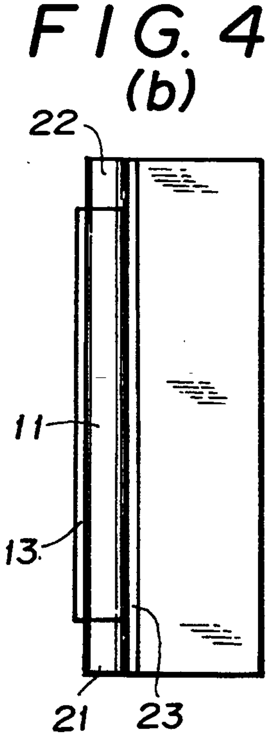
Figure 4:
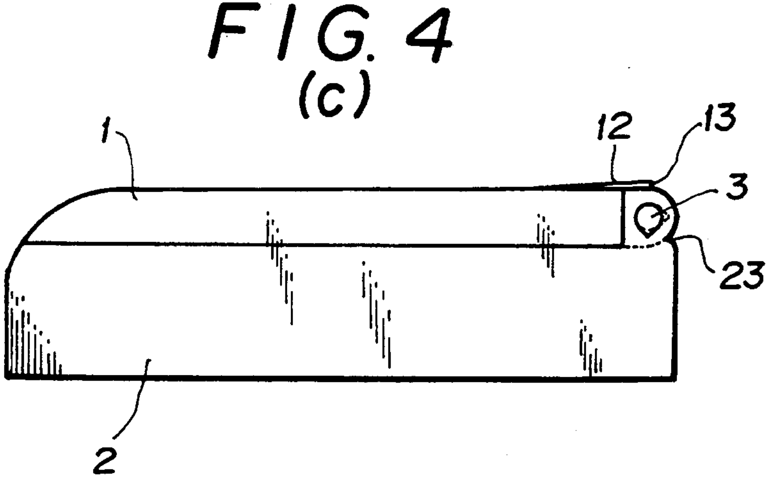

The shaft 3 thus incorporated constitutes a slow-acting rotary shaft device by being attached to the pivotally supporting portion of the hinge device 60 shown in FIG. 4.

In the hinge device 60, the rotative member 1 is supported pivotally around the shaft 3 with respect to the fixed member 2. At the rotative member 1, the shaft supporting portion 11 wherein the shaft 3 is insertable therethrough is formed at one side thereof, and on the surface of the shaft supporting portion 11 is formed a taper surface 12, at the top end surface of said taper surface 12 a stopper surface 13 being formed.

Further, bearing portions 21 and 22 are provided at the fixed member 2 so as to grasp the shaft supporting portion 11 of the rotative member 1, and at end surface of the bearing forming side portions 21 and 22 an abutment surface 23 to which a stopper surface 13 of the rotative member 1 abuts thereto is formed.

Figure 5:
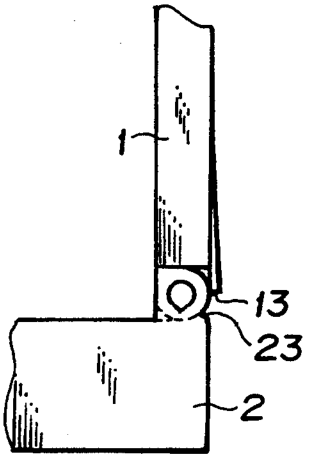
Figure 5:
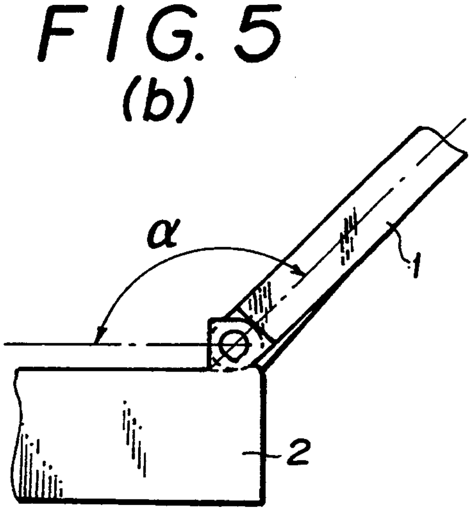
Figure 6:
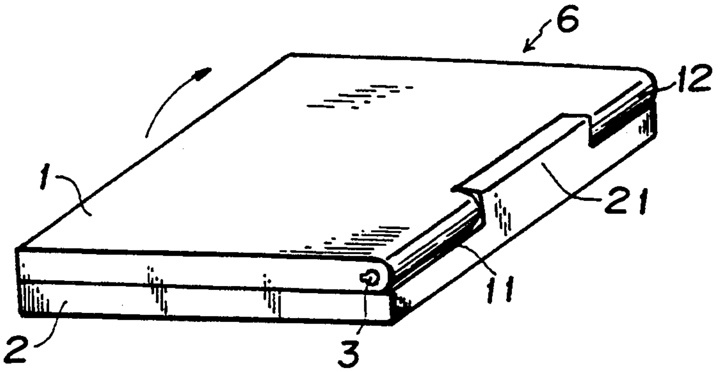
FIG. 6 PRIOR ART
Figure 7:
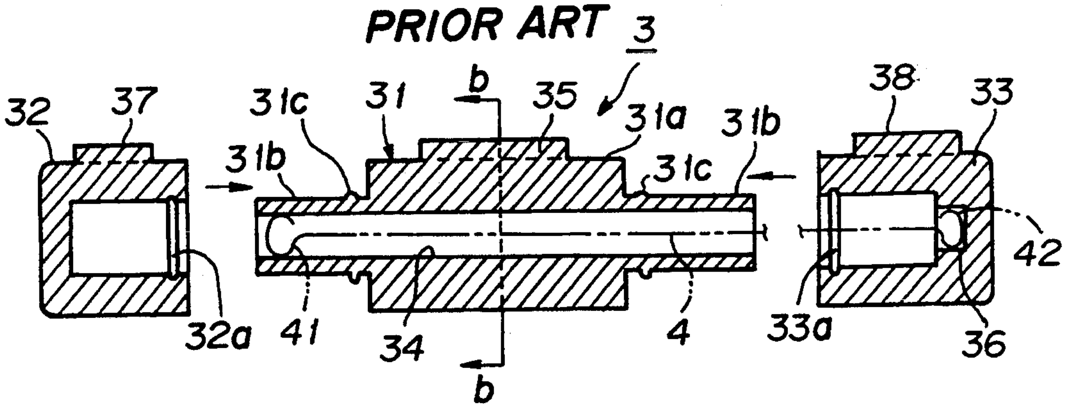
FIG. 7 PRIOR ART
Figure 8:
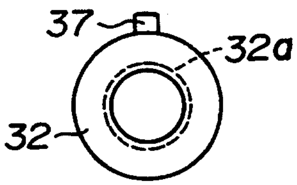
FIG. 8 (a) PRIOR ART
Figure 8:
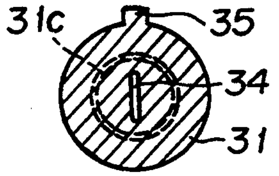
FIG. 8 (b) PRIOR ART
Figure 8:
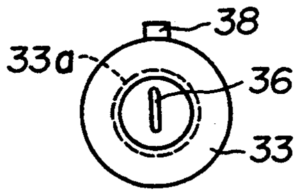
FIG. 8 (c) PRIOR ART
Figure 9:
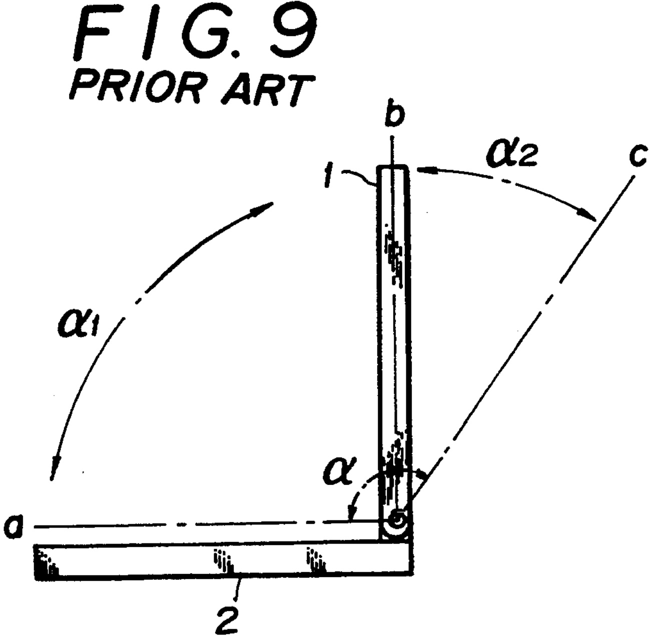
FIG. 9 PRIOR ART

By this, the rotative member 1 of the hinge device 60 becomes to be a whole opening state in FIG. 5(*b*) wherein the rotation is restrained by the abutment of the stopper surface 13 to the abutment surface 23 via neutral point in FIG. 5(*a*) which stands vertically from a whole closing state in FIG. 4(*c*). The rotation angle $\alpha$ from whole closing state of the rotative member 1 to the whole opening state at this time is about 135°.

The shaft 3 is inserted into the pivotally supporting portion of the rotative member 1 at the neutral point of the rotative member 1.

In other words, as shown in FIG. 5 (*a*), after the insertion holes provided at bearing portions 21 and 22 of the fixed member 2 are adapted to agree with a key groove (not shown) provided at the shaft supporting portion 11 of the rotary member 1 by approximately vertically standing up the rotative member 1, the shaft 3 is penetrated through the insertion hole, and then a key 37 of the cap member 32, a key 35 of the shaft body 31 and a key 38 of the cap member 33 are respectively inserted into a key groove of the bearing portion 22, a key groove of the shaft supporting portion 11 and a key groove of the bearing portion 21 whereby the body portion of the shaft body 31 and the cap members 32 and 33 are respectively attached to the rotative members 1 and the fixed member 2 inrotatably.

Then, an operation of this embodiment will be described as follows.

The connecting state of the body portion of the shaft body 31 and the latching portion when the rotative member 1 is positioned at the neutral point (FIG. 5(*a*)), is in a state wherein the projection 31*d* abuts against a side wall 7*d* (Please see FIG. 3). In this state, there exists a clearance between the projection 31*d* and a concave 7*c* defined by cutout 7*e*, said clearance forming a race area which allows a relative rotation of the body portion of the shaft body 31 and the latched portion.

When the rotative member 1 is rotated from the neutral point to the closing direction, the body portion of the shaft body 31 (small diameter portion 31*b*) rotates in A direction together with the rotative member 1 as shown in FIG. 3, said rotation being transmitted to the latching portion (cylinder 7) via projection 31*d* whereby the cylinder 7 is also rotated in the same direction. By the rotation of the rotative member 1 in the closing direction, the torsion bar 4 is twisted in the positive direction whereby an energy which rotates the rotative member 1 in the opening direction is stored and a whole closed state shown in FIG. 4(*c*) is obtained. In this whole closed state, the rotative member 1 is maintained in a whole closed state by an appropriate locking means ( not shown ).

Further, when the lock of the rotative member 1 in whole closed state is released, the rotative member 1 rotates in the opening direction by the torque of the torsion bar 4. The rotation at this time is subjected to a shearing resistance of the viscous grease and the rotation is performed with a slow speed in spite of the torque load of the torsion bar 4. The rotative member 1 stops near the neutral point in FIG. 5(*a*). The rotation of the negative member 1 in the opening direction hereafter is performed manually.

First, an outer force is loaded to the rotative member 1 which stops near the rotated in the opening direction. This rotation accompanies a rotation in B direction of the body portion (small diameter shaft portion 31*b*) of the shaft body 31 in FIG. 3. The rotation of the small diameter shaft portion 31*b* of the shaft body 31 at the time is performed in a race area wherein the projection 31*d* abuts against another side wall 7*e* of the concave 7*c*. Accordingly, the transmission of the rotation from the small diameter shaft portion 31*b* to the cylinder 7 does not occur, but only the small diameter shaft portion 31*b* performs to race. In the rotation of the rotative member 1 during this time, the torsion bar 4 remains in no load state without any twisting whereby the rotative member 1 can be stopped at any position due to the release of the outer force. This is because the rotation angle of the rotative member 1 is approximately 30° and the rotation moment of the rotative member 1 is also small, thereby being able to stop the rotative member 1 by only shearing resistance of the viscous grease.

Further, the rotative member 1 is allowed to be a whole opening state (FIG. 5(*b*)) by being rotated in the opening direction due to the load of the outer force. The rotation of the rotative member 1 during this time accompanies a further rotation in B direction of the small diameter shaft portion 31*b* thereby being rotated the cylinder 7 in the same direction via the projection 31*d*. The rotation of the cylinder 7 is performed twisting the torsion bar 4 in the negative direction against the closing direction at the time of the rotation of the rotative member 1. However, the rotation angle of the rotative member 1 during this time is approximately 15° and even if the twisting corresponding to this rotation angle is added to the torsion bar 4, a torque possible to return the rotative member 1 to the neutral point does not occur, said torque balancing with a synthetic force of the rotation moment of the rotative member 1 and the shearing resistance of the viscous grease thereby being able to stop the rotative member 1 released from the outer force at any position.

Further, since the twisting angle in the negative direction of the torsion bar 4 at this time becomes smaller, the permanent set of the torsion bar 4 due to the twisting in the negative direction does not also occur.

Thus, in this embodiment, the rotation area in the opening direction after the neutral point of the rotative member 1 can be adapted to be a free stop area.

Then, another embodiment will be described as follows.

This embodiment is a case wherein the hinge device is different from the above embodiment.

This case is one wherein a shaft 3 is attached to the pivotally supporting portion of the hinge device 6 described in the conventional art. In this case, the cap members 32 and 33 are attached respectively to shaft supporting portions 11 and 12 inrotatively and the body portion of the shaft body 31 is attached to bearing portion 21 of the fixed member 2 inrotatably.

In this case, in the free stop area herein only the shearing resistance of the viscous grease acts, the torsion bar 4 rotates in the same direction by the rotation of the cap member 33 which rotates together with the rotative member 1 via another end hook portion 42, while the cylinder 7 also rotates in the same direction 41 of the torsion bar 4.

By this, in this area the rotation of the rotative member 1 is performed without any twisting of the torsion bar 4 and the rotative member 1 released the outer force can be stopped at any position by the shearing resistance of the viscous grease.

Further, rotation in the opening direction of the rotative member 1 accompanies a twisting of the torsion bar 4 in the negative direction since the rotation of the cylinder 7 in the same direction is restrained by the latching of the projection 31*d* and the concave 7*c*.

Thus, in another embodiment, the torsion bar 4 is twisted in the negative direction via race area as same as in the above example, which makes the twisting angle in the negative direction of the torsion bar 4 smaller. Accordingly, another embodiment also effects the same operation as in the embodiment described above.

Further, this invention is not limited to the embodiments, but various kinds of modifications are considered within the scope not deviated from the gist thereof.

Furthermore, it is possible to provide the projection 31*d* at the latching portion (cylinder 7) side and to provide the concave 7*c* at the body portion (small diameter portion 31*b*) side.

Moreover, it is possible to provide a plurality of projections 31*d* and of concave 7*c* more than two respectively. This case has a merit wherein the relative rotation of the body portion and the latching portion which constitutes the shaft body 31 is stable.

As described above, according to this invention, it is possible to rotate the rotative member which rotates with regard to the fixed member with a slow speed from the whole closing state to the neutral point by the spring force of the torsion bar and the shearing resistance of the viscous grease and to amend the rotation area in the opening direction after the neutral point wherein the torsion bar is twisted in the negative direction to a free stop area. Accordingly, an easy in use and good hinge device can be provided.

Further, in the rotation area in the opening direction after the neutral point, since the torsion bar is adapted to be twisted in the negative direction via race area, the twisting angle thereof becomes smaller to the extent wherein the permanent set does not occur to the torsion bar, thereby being able to maintain the conventional endurance thereof.

What I claim is:

1. A slow-acting rotary shaft device, comprising:

a rotary member which rotates relative to a stationary member, a hollow shaft body latched with said rotary member, two cap members, each of which is inserted pivotally on one end of said hollow shaft body and latched to said stationary member, a torsion bar, one end of which is latched with said hollow shaft body and another end of which is latched with one of said cap members, and viscous grease shielded between said hollow shaft body and said cap members, said hollow shaft body being divided into two portions, one of said two portions being a main portion which is latched with said rotary member, the other of said two portions being latched with the end of said torsion bar, one of said two portions having a projection and the other of said two portions having a concave, said projection and said concave being disposed on opposing end surfaces of said two portions, said projection and said concave together defining an idling area so that said two portions are rotatable relative to each other, and said projection being urged upon one wall of said concave when said device is assembled with said rotary member being closed.

2. A slow-acting rotary shaft device according to claim 1, wherein initial torque is stored in said torsion bar, with said rotary member closed, in order to rotate said rotary member automatically, in a direction of opening up to a neutral position in which said rotary member is in a vertical state.

3. A slow-acting rotary shaft device according to claim 2, wherein, when said rotary member moves beyond said neutral position, by virtue of said idling area, said torsion bar is free of load in said idling area, said idling area being approximately 30°, a gravity moment of said rotary member being balanced by shearing resistance of said grease so as to stop said rotary member at an arbitrary position and wherein up to an ultimate opening position of said rotary member of approximately 15°, the total of shearing resistance of the grease and a recoil force of said torsion bar balances with the gravity moment of said rotary member, permitting stoppage of said rotary member at said arbitrary position.

4. A slow-acting rotary shaft device according to claim 1, wherein said viscous grease enables rotation to be slow and moderate throughout all rotations of said rotary member relative to said stationary member.

* * * * *